United States Patent
Kawai et al.

(10) Patent No.: US 6,705,098 B2
(45) Date of Patent: Mar. 16, 2004

(54) VEHICLE AIR CONDITIONER WITH AUTOMATIC AIR-CONDITIONING CONTROL

(75) Inventors: Takayoshi Kawai, Hoi-gun (JP); Akira Ohga, Ichinomiya (JP); Yuichi Kajino, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/247,078

(22) Filed: Sep. 19, 2002

(65) Prior Publication Data

US 2003/0051491 A1 Mar. 20, 2003

(30) Foreign Application Priority Data

Sep. 20, 2001 (JP) .................. 2001-287311

(51) Int. Cl.⁷ .................... F25D 29/00; G05D 23/00
(52) U.S. Cl. ...................... 62/161; 236/91 C
(58) Field of Search ............... 62/161, 158, 157, 62/231, 267; 236/91 C; 165/265, 270

(56) References Cited

U.S. PATENT DOCUMENTS 5,088,298 A * 2/1992 Fujii .................. 62/228.5
5,676,204 A * 10/1997 Samukawa et al. ......... 165/204
6,488,213 B2 * 12/2002 Ohga et al. ............. 236/49.3

FOREIGN PATENT DOCUMENTS

JP        8-197933        8/1996

* cited by examiner

Primary Examiner—Marc Norman
(74) Attorney, Agent, or Firm—Harness, Dickey & Pierce, PLC

(57) ABSTRACT

A vehicle air conditioner has a standby RAM having a map memorizing many regions of, for example, preset temperature, each of which is determined by environmental conditions such as the inside/outside air temperatures and the sunlight amount. The air conditioner automatically controls the air conditioning of the passenger compartment of the vehicle based on the information stored in the region of the map determined by the environmental conditions that is regarded as a control preset temperature used for calculating a target blowing temperature in a control flow repeating cyclically. When the preset temperatures read at the previous cycle and the current cycle are different from each other, the control preset temperature is regarded as the preset temperature which changes gradually from the previous one to the current one, whereby the temperature of air blown into the passenger compartment gradually changes.

8 Claims, 6 Drawing Sheets

VEHICLE AIR CONDITIONER WITH AUTOMATIC AIR-CONDITIONING CONTROL

CROSS REFERENCE TO RELATED APPLICATION

This application is based upon Japanese Patent Application No. 2001-287311, filed on Sep. 20, 2001, the contents of which are incorporated herein by reference.

BACKGROUND OF THE INVENTION

1. Field of the Invention

The present invention relates to a vehicle air conditioner, which has an automatic air-conditioning control function and a learning control function of a passenger's preference for reflecting the passenger's preference to air-conditioning.

2. Related Art

An air conditioner such as the one disclosed in JP-A-8-197933 has a learning control function. The air conditioner memorizes the preset temperature in each condition determined by the detected value of the environmental condition of a vehicle such as the inside air temperature and the outside air temperature. When the passenger performs the changing operation of the preset temperature to change the inside air temperature to the preferred temperature of the passenger, the air conditioner learns the preference of the passenger by changing the preset temperature, which is memorized in the memory portion in association with the detected value of the environmental condition of the vehicle when the changing operation is conducted, to the temperature corresponding to the preferred temperature of the passenger. The air conditioner automatically controls the condition in the vehicle based on the preset temperature, which is indicated by the memory portion in association with the detected value of the environmental condition of the vehicle at the time when the detected value of the environmental condition of the vehicle is change while the air-conditioning operation is activated.

On the other hand, there is another air conditioner that learns the passenger's preference of, for example, the blowing mode of the conditioned air, the amount of the conditioned air blown into the passenger compartment, the sucking mode of the air, the blowing direction of the conditioned air from the air duct or the like in addition to the learning control function of the temperature as described above.

However, the air conditioner described in the prior art changes the temperature of the air blown into the passenger compartment drastically when the difference between the detected value and the preset value of the temperature is large, whereby the passenger feels uncomfortable.

Moreover, in the above-described other type of the air conditioner that learns the passenger's preference relating to the blowing mode and the like, the sound pressure level is rapidly increased to cause uncomfortable feeling to the passenger when, for example, the amount of the air blown into the passenger compartment is rapidly increased, or the sucking air mode is rapidly changed from an outside-air mode to an inside-air mode.

SUMMARY OF THE INVENTION

An object of the invention is to provide an improved vehicle air conditioner that controls air conditioning automatically.

According to an aspect of the present invention, the air conditioner has an operational portion for setting a desired condition in the air conditioning of the vehicle that is manually operated by a passenger, a memory portion for memorizing information of said desired condition in association with a detected value of environmental condition relating to the air conditioning of the vehicle, and for correcting the memorized information of said desired condition based on an operation of the operational portion. The air conditioner automatically controls the air conditioning in a passenger compartment of the vehicle based on the memorized information determined by the detected value of environmental condition that is read from the memory portion. When the content of the former memorized information read before the detected value of the environmental condition changes is different from that of the latter memorized information read after the detected value of environmental condition changes, the content of the former memorized information is varied gradually so as to approximate that of the latter memorized information, and then, the air conditioner automatically controls the air conditioning based on said gradually varied information.

Suppose that the memorized information relates to inside air temperature that the passenger prefers, even if the difference between the preset temperatures respectively read before and after the detected value of environmental condition changes is large, the temperature of the air blown from a blow-out port gradually changes since the inside condition of the vehicle is automatically controlled in accordance with the gradually varied information, thereby reducing or eliminating the uncomfortable feeling of the user caused by the rapidly change of the temperature of air blown into the passenger compartment.

There might be many ways to gradually change the memorized information.

According to another aspect of the present invention, a vehicle air conditioner has various blow-out modes such as a FOOT mode in which the conditioned air is blown to an upper body of the passenger, a FACE mode in which the conditioned air is blown to feet of the passenger and a BI-LEVEL mode in which the conditioned air is blown to both of the upper body of the passenger and the feet of the passenger, and automatically changes these blow-out mode. In this air conditioner, when the blow-out mode is changed from the FOOT mode to the FACE mode because of the change in environmental condition, the blow-out mode is changed from the FOOT mode to the FACE mode through the BI-LEVEL mode, vise versa.

With this feature, the blow-out mode is not changed from the FOOT mode to the FACE mode directly, thereby reducing or eliminating the uncomfortable feeling of the passenger that would be caused by the rapidly change.

Other features and advantages of the present invention will become more apparent from the following detailed description made with reference to the accompanying drawings.

DETAILED DESCRIPTION OF THE PREFERRED EMBODIMENT

Specific embodiments of the present invention will now be described hereinafter with reference to the accompanying drawings in which the same or similar component parts are designated by the same or similar reference numerals.

(First Embodiment)

First, a schematic ventilation system in which air is blown toward a passenger compartment of a vehicle will be described with reference to FIG. 1. An air conditioning unit 10 has an inside/outside air switching box 11 in which an outside air inlet 11a for introducing outside air (air of the outside of the vehicle) and an inside air inlet 11b for introducing inside air (air of the passenger compartment). The inside/outside air switching box 11 is provided at the most upstream end of the air conditioning unit 10.

The inside/outside air switching box 11 has an inside/outside switching door 12 rotatably disposed therein between the outside air inlet 11a and the inside air inlet 11b. The inside/outside switching door 12 is driven by an electric-drive apparatus 12a such as a servomotor. The switching door 12 opens and closes the outside air inlet 11a and the inside air inlet 11b to determine from which inlet the air should be introduced or determine the mixing rate between the air from the outside of the vehicle and the air from the passenger compartment of the vehicle.

An air blower unit 13 is provided at a downstream side of the inside/outside air switching box 11 in the air conditioning unit 10, for blowing air to the downstream side of the air conditioning unit 10. The air blower unit 13 has a blower-driving motor 14 and a centrifugal blower fan 15 connected to a rotor shaft of the blower-driving motor 14. An evaporator 16 and a heater core 17 are arranged in the downstream side of the blower fan 15.

The evaporator 16 is a cooling heat exchanger and constitutes a refrigeration cycle with a compressor driven by an engine (not shown) and the like, for cooling air by absorbing heat from the air coming into the air conditioning unit 10 by causing evaporation of low-pressure coolant. The heater core 17 is a heating heat exchanger, for heating the air using hot water (cooling water) flowing in the engine 20 as a heat source.

An air mix door 18 is rotatably provided at a upstream side of the heater core 17. The air mix door 18 is driven by an actuator 18a to determine an opening degree thereof for adjusting the ratio between the amount of heated air passing through the heater core 21 and the amount of cooled air bypassing the heater core 17, thereby adjusting the temperature of the air blown into the passenger compartment. Namely, the heated air passing through the heater core 21 and the cooled air bypassing the heater core 17 are mixed with each other so as to make air having a temperature indicated by a passenger. Therefore, the air mix door constitutes a temperature adjusting means for the air blown into the passenger compartment.

At the most downstream end of the ventilation passage in the air conditioning unit 10, a blow-out mode switching portion is provided. More specifically, a defroster door 20 for opening and closing a defroster blow-out port 19, a face door 22 for opening and closing a face blow-out port 21 and a foot door 24 for opening and closing a foot blow-out port 23 are provided. These doors 20, 22, 24 are driven by an actuator 25 to determine a blow-out mode of the conditioned air, for example, a FACE mode (FACE), a BI-LEVEL mode (B/L), a FOOT mode (FOOT), a FOOT-DEF mode or a DEFROSTER mode. The conditioned air is blown into the passenger compartment from an opened port according to the blow-out mode.

When the FACE mode is selected, the face blow-out port 21 is fully opened while the defroster blow-out port 19 and the foot blow-out port 23 are closed, thereby blowing out the conditioned air only through the face blow-out port 21 toward an upper body of the passenger in the passenger compartment of the vehicle.

When the BI-LEVEL mode is selected, the face blow-out port 21 and the foot blow-out port 23 are fully opened while the defroster blow-out port 19 is closed, thereby blowing out the conditioned air through the face blow-out port 21 and the foot blow-out mode toward the upper body and feet of the passenger in the passenger compartment of the vehicle at the substantially equal amount of the conditioned air.

When the FOOT mode is selected, the foot blow-out port 23 is fully opened while the face blow-out port 21 is closed, and the defroster blow-out port 19 is slightly opened. As a result, the conditioned air is mainly blown toward the feet of the passenger through the foot blow-out port 19 while some of the conditioned air is blown toward an inside part of a windshield of the vehicle.

When the DEFROSTER mode is selected, the defroster blow-out port 19 is fully opened while the face blow-out port 21 and the foot blow-out port 23 are closed, thereby blowing out the conditioned air only through the defroster blow-out port 19 toward the inside part of the windshield of the vehicle.

When the FOOT-DEFROSTER mode is selected, the defroster blow-out port 19 and the foot blow-out port 23 are fully opened while the face blow-out port 21 is closed, thereby blowing out the conditioned air through the defroster blow-out port 19 and the foot blow-out mode at the substantially same amount of the conditioned air.

An air conditioning control device 30 has a microcomputer 31 as a control means. The amount of the conditioned air blown into the passenger compartment is controlled by determining the revolution speed of the blower motor 14 that is determined by the applied voltage (blower voltage) thereto. The blower voltage is adjusted in accordance with an output signal from the microcomputer through a drive circuit 32. Other actuators 12a, 18a and 25 are also controlled by the drive circuit 32 based on output signals from the microcomputer 31.

The microcomputer 31 has a well-known structure including a CPU, a ROM portion, a RAM portion, a standby RAM portion, an I/O port portion, an A/D converter and the like.

The standby RAM serves as a memory means, i.e., a backup memory for storing values (information) that have the passenger's preferences learned through the operations by the passenger even when an ignition switch (hereinafter, referred to as an IG) is turned off that changes the status of the engine from an active condition to a non-active condition, and vice versa. The voltage is supplied to the standby RAM directly from a battery equipped in the vehicle, not through the IG even if the IG is turned off. Besides, a backup battery (not shown) is equipped with the vehicle to supply voltage to the microcomputer 31 for a short time in a situation that the microcomputer 31 is disconnected from the battery.

Operational signals are input to the microcomputer 31 that are sent from an air conditioning operational portion 33 arranged on an instrument panel in the passenger compartment. Many kinds of switches are provided in the operational portion 33, such as an AUTO switch 34 for setting an automatic control condition of the air conditioner, an inside/outside air selecting switch 35 for manually selecting an inlet mode between an inside air inlet mode and an outside air inlet mode, a blow-out mode selecting switch 36 for manually selecting the blow-out mode described above, a blowing air amount adjusting switch 37 for manually adjusting the amount of air blown by the fan 15, a temperature setting switch 38 for setting a preferred temperature of the passenger. The temperature setting switch 38 serves as an operational portion operated by the passenger for setting a passenger's desired condition in the air conditioning of the vehicle.

The microcomputer 31 receives sensor signals from several sensors each of which detects an environmental condition that influences the air conditioning in the passenger compartment. More specifically, the sensors are an inside air temperature sensor 39 for detecting the temperature (TR) of the outside air in the passenger compartment, an outside air temperature sensor 40 for detecting the temperature (TAM) of the inside air of the vehicle, a sunlight sensor 41 for detecting the amount of sunlight (TS) incident into the passenger compartment, an evaporator temperature sensor 42 for detecting the temperature (TE) of the evaporator (actually, the temperature of the air immediately after passing through the evaporator), a water temperature sensor 43 for detecting the temperature (TW) of the cooling water circulating in the engine and the heater core 17 and the like. The signals from those sensors are input to the microcomputer after being converted by the A/D converter. A signal sent from the temperature setting switch 38 is also input to the microcomputer 31 after its level is converted by a level converter circuit 44.

The blowing air amount adjusting switch 37 has an up amount switch 37a and a down amount switch 37b both of which are push type switches. The up amount switch 37a outputs an increase signal by which the blower voltage (the voltage supplied to the drive motor 14) is increased at one level that denotes 0.25 volts in every single pushing operation by the passenger. To the contrary, the down amount switch 37b outputs a reduction signal by which the blower voltage is reduced at one level that denotes 0.25 volts in every single pushing operation by the passenger.

Figure 2:
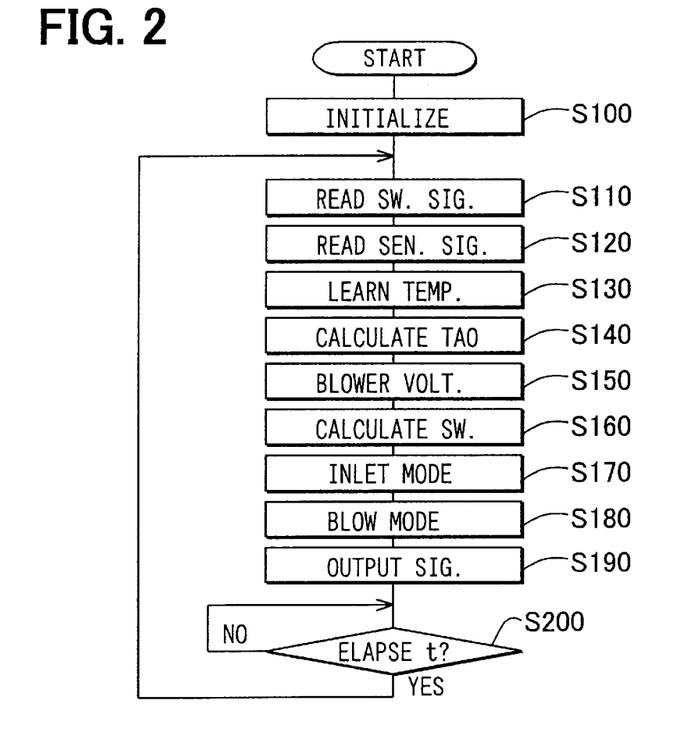
FIG. 2 is a flow chart showing an automatic air conditioning control of the first embodiment of the present invention.

Next, a flow chart executed by the microcomputer 31 in this embodiment will be described with reference to FIG. 2. This flow chart will start by turning on the IG. First of all, every conversion and setting of initial values of flags or the like are executed in step S100. Next, the microcomputer 31 reads the operational signals from the switches 34–38 in step S110. Then, the microcomputer 31 reads the detected signals indicative of the environmental conditions of the vehicle from the sensors 39–43 in step S120.

In following step S130, if the temperature setting switch 38 is operated by the passenger to adjust the temperature of the inside air to comply with the passenger's preferred temperature in the passenger compartment, the microcomputer 31 learns the preferred temperature by correcting a preset temperature memorized in the standby RAM after being operated. The detail of the step S130 will be described later.

Next, a target blowing temperature TAO of the air blown into the passenger compartment is calculated in step S140 based on detected signals indicative of the environmental conditions that are read out at the step S120 and the preset temperature in the standby RAM that may be the value after being learned by the microcomputer. When the preset temperature after being learned that is used in calculating the TAO is a control preset temperature TSET, the TAO becomes a necessary air blowing temperature for keeping the passenger compartment at the control preset temperature TSET regardless of change in the environmental condition (heat load condition).

Figure 3:
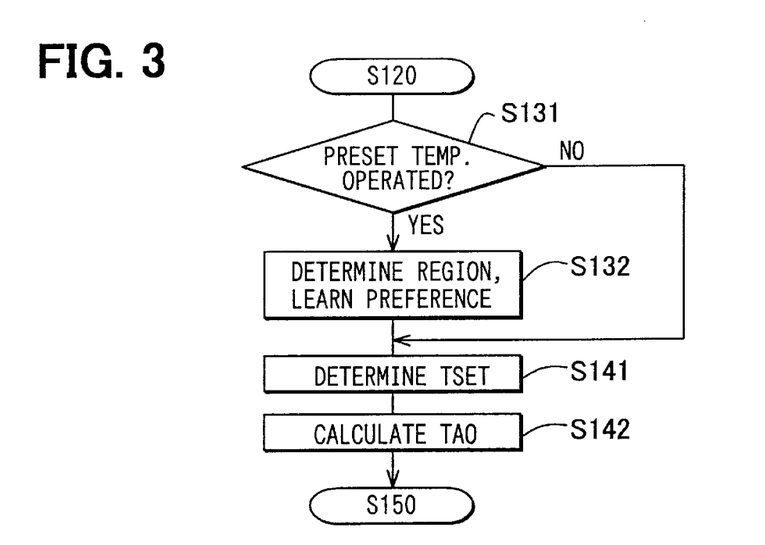
FIG. 3 is a flow chart showing a main feature of the control of the first embodiment of the present invention.

The concrete performance in the steps S130 and S140 will be described with reference to FIG. 3. In step S131, it is determined whether or not the passenger has manually changed to set his/her preferred temperature in the passenger compartment based on the operational signal indicative of the switch that was read in step S110. If it is determined that the passenger did, then, the flow will continue to the next step S132.

Figure 4:
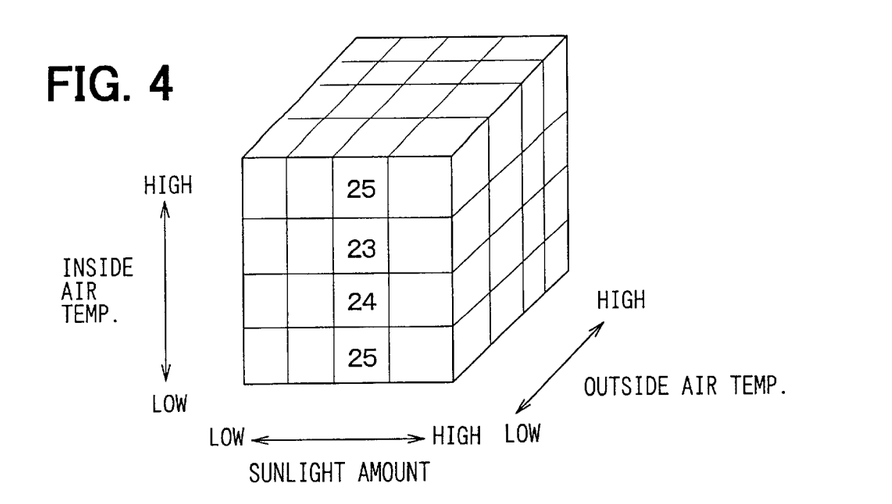
FIG. 4 is a diagram showing the characteristic of preset temperature of the first embodiment of the present invention.

As shown in FIG. 4, the standby RAM has a three dimensional control preset temperature map that has regions divided in accordance with the inside air temperature, the outside air temperature and the sunlight amount. Each region has its own control preset temperature, which is initially set at a central value of the control preset temperature, for example, 25° C. When the passenger manually operates the temperature setting switch 38 to set his/her preferred temperature in the passenger compartment, the microcomputer learns the preferred temperature by correcting the control preset temperature memorized in a region determined by the inside temperature, the outside temperature and the sunlight amount all of which are read at step S120, and by rememorizing the control preset temperature after being corrected. FIG. 4 shows samples of the control preset temperatures of the regions rewritten by correcting as described above.

Subsequently, the flow will continue to step S141 from step S132. The flow also will continue to step S141 from the step S131 when it is determined that the passenger has not manually operated the temperature setting switch 38 to set the preferred temperature in the passenger compartment.

In step S141, the control preset temperature TSET, which is used for calculating the TAO, is determined as follows.

The control preset temperature, which is stored in the region determined by the information described above, is read out from the latest (after being learned) preset temperature map in the standby RAM.

Next, the control preset temperature read out at a previous time and the control preset temperature read out at this time are compared. When both are the same, it is determined that the control preset temperature read out this time is regarded as the control preset temperature TSET for calculating the next TAO.

Figure 5:
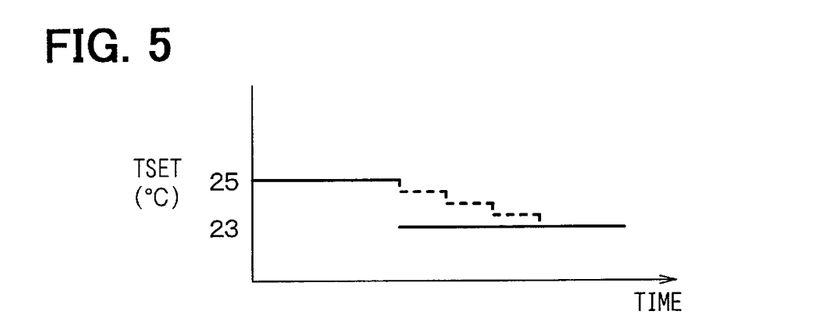
FIG. 5 is a diagram showing a sample of correction of preset temperature in the first embodiment of the present invention.

On the other hand, when both are different from each other due to change in the inside air temperature, the outside air temperature or the sunlight amount, the control preset temperature TSET for calculating the next TAO is gradually varied. One sample of variation of the TSET is shown in FIG. 5. The gradually varied TSET as shown in FIG. 5 is regarded as the TSET for calculating the next TAO, that is gradually changed by a step of a predetermined amount (for example, 0.5° C.) in every predetermined amount of time (for example, 20 seconds) so as to gradually change from the previous control preset temperature (25° C. in this example) to the control preset temperature to be set (23° C. in this example) at this time. As the other variation of the TSET, a variation based on time constant can be adopted, which is obtained by multiplying a value that changes gradually as time elapses so as to gradually change from the previous control preset temperature to this control preset temperature.

Next, the flow will continue to the step S142 to calculate the TAO using the following equation (1) based on the control preset temperature TSET determined at the step S141.

$$TAO=KSET \times TSET-KR \times TR-KAM \times TAM-KS \times TS+C \qquad (1)$$

Wherein KSET, KR, KAM and KS represent coefficients, and C represents a correction constant. TSET, TR, TAM, TS represent the control preset temperature, the inside air temperature, the outside air temperature, the sunlight amount as described above, respectively.

Figure 6:
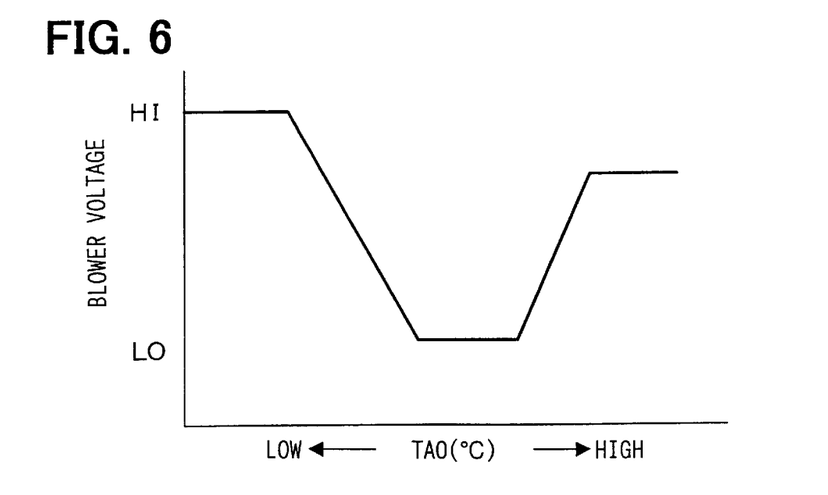
FIG. 6 is a diagram showing the characteristic of the amount of air blown into a passenger compartment in the first embodiment of the present invention.

Next, in step S150, a blower voltage for determining the blowing air amount is determined from a control characteristic (map) shown in FIG. 6 based on the TAO determined by the above-described equation (1).

Next, a target opening degree SW of the air mix door 18 is calculated according to the following equation (2) based on the TAO described above. The temperature of air after passing through the evaporator TE and the temperature of the hot water TW are values read out at the step S120 (as shown in FIG. 1).

$$SW=((TAO-TE)/(TW-TE)) \times 100(\%) \qquad (2)$$

Figure 7:
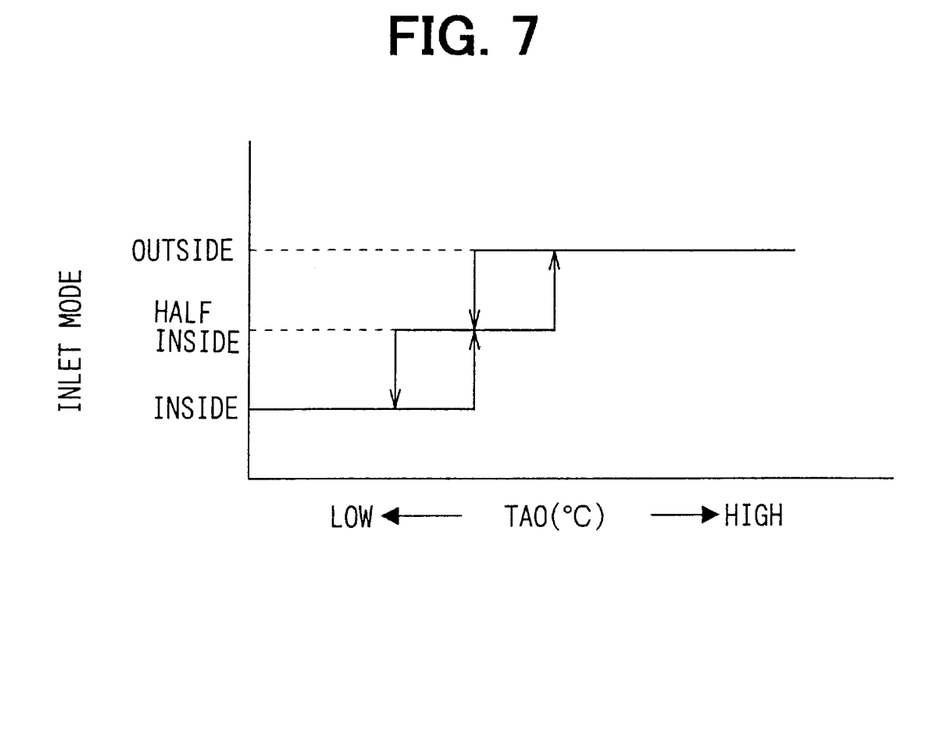
FIG. 7 is a diagram showing the characteristic of inside/outside air sucking mode in the first embodiment of the present invention.
Figure 8:
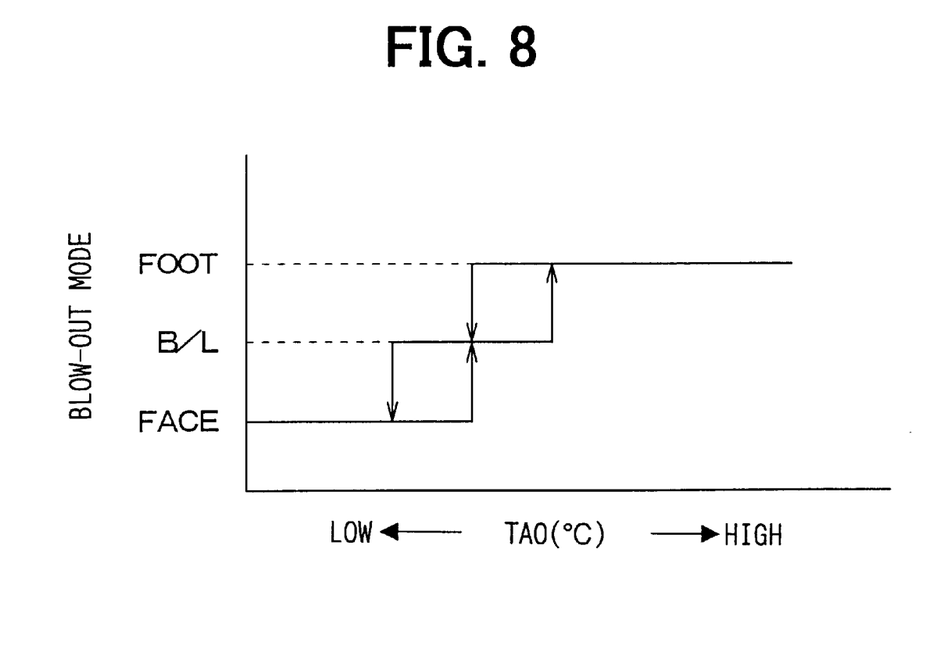
FIG. 8 is a diagram showing the characteristic of blowout modes in the first embodiment of the present invention.

Next, the flow will continue to determine the inside/outside air inlet mode that is adjusted by the inside/outside-air switching door 12 by using a control characteristic (map) shown in FIG. 7 based on the TAO. Then, the flow will continue to step S180 to determine the blow-out mode that is achieved with the blow-out mode doors 20, 22 and 24 by using a control characteristic (map) shown in FIG. 8 based on the TAO.

After that, the flow will continue to step S190 to control an activation in each actuator 12a, 18a and 25 in addition to the revolution rate of the blower motor 14 by supplying control signals to them through the drive circuit 32 that are obtained at each step S150 to S180.

Next, it is determined whether or not time t has passed that represents a control cycle of the air conditioning. When the time t has passed, the flow restarts from the step S110.

According to this embodiment, when the control preset temperature at a previous time and the control preset temperature at this time are different from each other, both of which are read out from the preset temperature map shown in FIG. 4, that is, when there is difference between the preset temperatures read out respectively before the environment condition changes and after the environment condition changes, the control preset temperature is gradually varied, and the TAO is calculated based on this gradual varied control preset temperature. Therefore, the temperature of air blown into the passenger compartment also changes gradually, thereby preventing or reducing the uncomfortable feeling of the passenger caused by rapid change in temperature of the air blown into the passenger compartment.

Incidentally, in this embodiment, the preset temperature restored as the map shown in FIG. 4 is formed based on the sunlight amount in addition to the inside/outside air temperatures. Therefore, the air conditioning by using the map shown in FIG. 4 may be more suitable for the temperature feeling of the passenger.

(Second Embodiment)

In the first embodiment, the microcomputer learns the passenger's preference only on the control preset temperature though, the microcomputer learns the other preference such as the blow-out mode as well in this embodiment. Therefore, the step S180 in FIG. 2 that is for determining the current blow-out mode is shown as the flow shown in FIG. 9, and the map shown in FIG. 8 changes to a map shown in FIG. 10. The other features are the same as those of the first embodiment.

Figure 9:
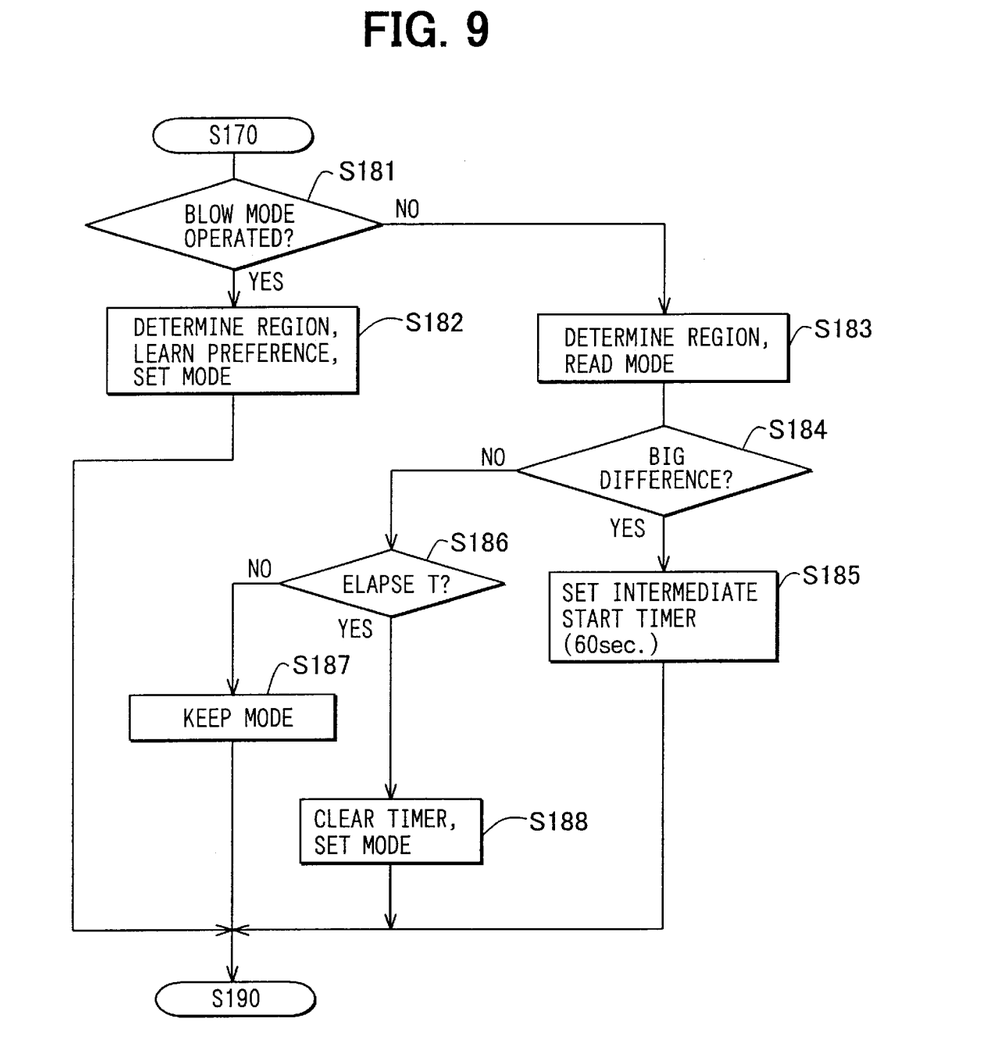
FIG. 9 is a flow chart showing a main feature of the control of a second embodiment of the present invention.

As shown in FIG. 9, the blow-out mode determining step comprises many steps. In the first step S181, it is determined whether or not the passenger manually changed the blow-out mode, i.e., the blow-out mode switch 36 has been changed by referring to the switch operational signal read out at the step S110. When it is determined that the switch 36 has been manually changed, the flow will continue to step S182.

Figure 10:
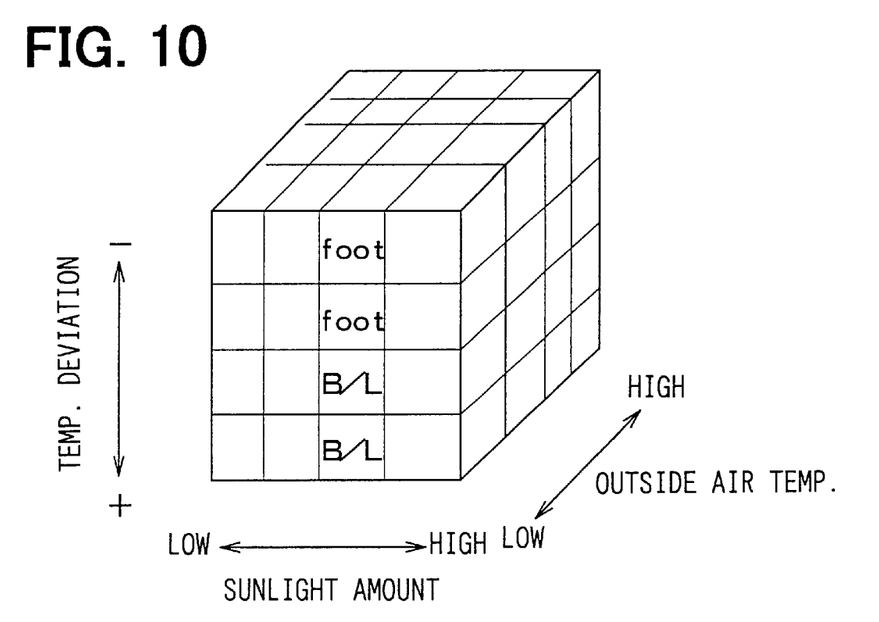
FIG. 10 is a diagram showing the characteristic of blow-out modes in the second embodiment of the present invention.

As shown in FIG. 10, the standby RAM has a three dimensional blow-out mode map that has regions divided in accordance with the temperature deviation Td (Td=[inside temperature]−[control preset temperature read at the step S141]), the outside air temperature and the sunlight amount. Each region has its own blow-out mode, which is initially set at a predetermined blow-out mode complying with the feeling of average passengers (the FACE mode (FACE), the BI-LEVEL mode (B/L) and the FOOT mode (FOOT)).

In step S182, it specifies the region in the map shown in FIG. 10 based on the inside air temperature, the outside air temperature and the sunlight amount all of which are read at the step S120, and the control preset temperature read at the step S141. That region is corrected to be rewritten (rememorized) from the blow-out mode memorized previously to that set manually by the passenger. It is determined that the blow-out mode after being learned is regarded as the blow-out mode in this time. Then, the flow will continue to the step S190 as shown in FIG. 2.

Meanwhile, when it is determined that the blow-out mode switch 36 has not been operated manually, the flow will continue to step S183. In this step S183, it specifies the region in the map shown in FIG. 10 based on the inside air temperature, the outside air temperature, the sunlight and the like. Then, the blow-out mode memorized in the specified region is read out.

Next, the flow will continue to step S184 to compare the blow-out mode read at a previous time and the blow-out mode read out at this time to determine whether the difference between them is large or not. When the FACE mode, the BI-LEVEL mode, the FOOT mode and the FOOT-DEFROSTER mode are referred to as (I), (II), (III) and (IV), respectively, the difference is determined as small between adjacent modes such as (I)–(II), (II)–(III) and (III)–(IV) so that the determination in the step S184 becomes "NO", while the difference is determined as large between non-adjacent modes such as (I)–(III), (I)–(IV) and (II)–(IV) so that the determination in the step S184 becomes "YES" When the determination in the step S184 is "YES", the flow will continue to step S185. In the step S185, an intermediate mode is selected as the blow-out mode at this time, and timer T starts. Then, the flow will continue to step S190. When the blow-out mode changes from the FACE mode to the FOOT mode (and vice versa), the BI-LEVEL mode becomes the intermediate mode. When the blow-out mode changes from the FACE mode to the FOOT-DEFROSTER mode (and vice versa), the BI-LEVEL mode or the FOOT mode becomes the intermediate mode. When the blow-out mode changes from the BI-LEVEL mode to the FOOT-DEFROSTER mode (and vice versa), the FOOT mode becomes the intermediate mode.

When the determination in the step S184 is "NO", the flow will continue to step S186. In the step S186, it is determined whether the timer T has finished or not. In this embodiment, the timer T is set to finish when reaching 60 seconds. When it is not determined that the timer T has finished, the determination in the step S186 becomes "NO", then the flow will continue to step S187 to keep the current blow-out mode. After that, the flow will continue to the step S190.

When it is determined that the timer T has finished, the determination in the step S186 becomes "YES". Then the flow will continue to step S188 to clear the timer T and determine that the blow-out mode in the region read at this time is regarded as the blow-out mode at this time. Then, the flow will continue to step S190.

Figure 1:
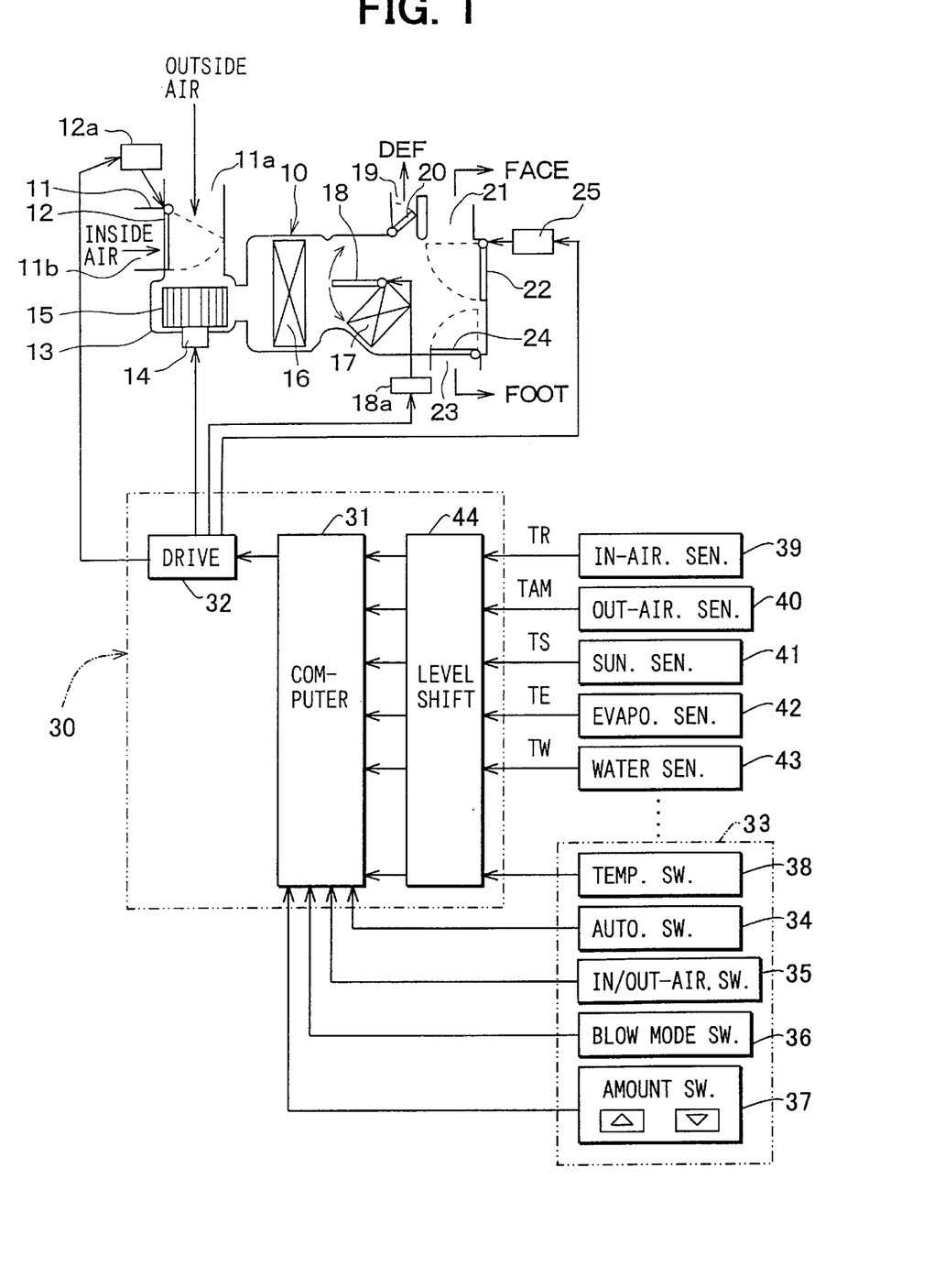
FIG. 1 is a system diagram illustrating a construction of a ventilation system according to a first embodiment of the present invention.

In step S190, the actuator 25 shown in FIG. 1 is activated based on the control signals determined at each step S182, S185, S187 and S188.

Figure 11:
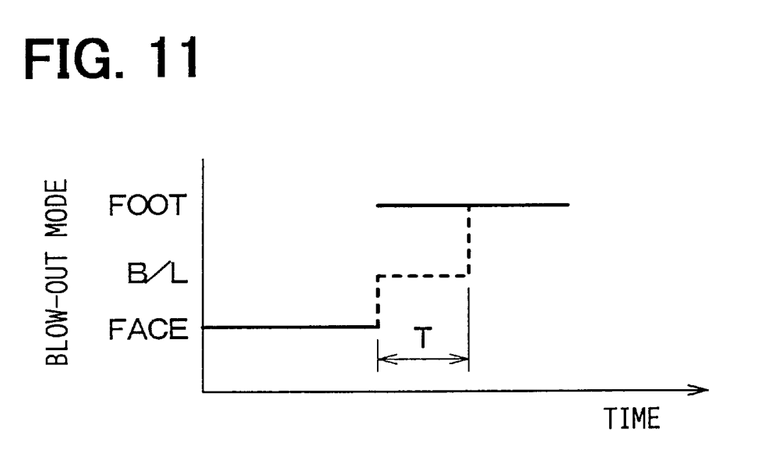
FIG. 11 is a diagram showing control pattern of blow-out modes in the second embodiment of the present invention.

FIG. 11 shows a control diagram when the determination in the step S184 is "YES". When the blow-out mode changes from the previous time mode (FACE mode in this embodiment) to the this time mode (FOOT mode in this embodiment), the intermediate modes (BI-LEVEL mode in this embodiment) is set for the predetermined time period (60 seconds in this embodiment) between the two mode described above as shown in the dotted line in FIG. 11.

Although the intermediate mode is set for the predetermined time period when the determination in the step S184 is "YES", the other diagram can be adopted, for example, such that the current blow-out mode is kept at the intermediate mode before the inside air temperature changes by 1° C., and after the inside air temperature changes by 1° C., then the blow-out mode read at this time is selected as the blow-out mode to be set. Moreover, although the intermediate mode is set for gradually shifting from one blow-out mode to the other mode to be memorized in the map shown in FIG. 10, the information memorized in the region can be rewritten in accordance with the predetermined amount of change in the inside air temperature in the vehicle (for example, 1° C.).

According to this embodiment, the blow-out mode does not change, for example, from the FACE mode to the FOOT mode, or FOOT mode to the FACE mode directly, thereby reducing or preventing the uncomfortable feeling of the passenger because of the rapid change in the blow-out mode.

In the above embodiments, the inside temperature, the outside temperature, the sunlight amount or the temperature deviation is used as information to determine the preset temperature or the blow-out mode in the map shown in FIG. 4 or 10, the feeling of the passenger due to temperature such as the passenger surface temperature can be used as information instead of the inside air temperature or the temperature deviation.

In the map shown in FIG. 4 or 10, hysteresis may be adopted when the region changes from one region (A) to the other region (B), and from the other region (B) to the one region (A) to prevent hunching.

Moreover, other memory elements such as EEPROM (nonvolatile memory) can be used for the memory means instead of the standby RAM. The map for memorizing information determined by the environmental conditions described above also can be many kinds. It is not limited to a 3-dimensional map, but can be a single-dimensional map or two-dimensional map, 4-dimensional map or the like, if desired.

Furthermore, operations can be adopted as follows.

The microcomputer 31 can learn a control characteristic map of the amount of the blown-out air based on the operation of the blowing air amount adjusting switch 37 by correcting it. When the difference between the blower voltage read at a previous time and the blower voltage read at this time is large, the blower voltage can be varied gradually to gradually change the amount of air blown into the passenger compartment.

Or, the microcomputer can learn a control characteristic map of the inlet mode by correcting it. When the inlet mode changes from the outside air inlet mode to the inside air inlet mode, or vice versa, the inlet mode is set at a half-inside air mode for the predetermined time that is an intermediate mode between the two modes.

In an air conditioning apparatus in which a blow-out direction of the conditioned air toward the passenger compartment can be adjustable automatically using a swing grill driven by an actuator, the microcomputer can learn a control characteristic map of the blow-out direction by correcting it based on the operation by the passenger. When the difference between the blow-out direction read out at a previous time and the blow-out direction read out at this time is large, the direction is set at an intermediate blow-out direction between the two directions for the predetermined time.

While the present invention has been shown and described with reference to the foregoing preferred embodiment, it will be apparent to those skilled in the art that changes in form and detail may be therein without departing from the scope of the invention as defined in the appended claims.

What is claimed is:

1. A vehicle air conditioner having automatic control, comprising:
   an operational portion for setting a desired condition in the air conditioning of a passenger compartment of the vehicle that is manually operated by a passenger;
   a memory portion for memorizing information of said desired condition in association with a detected value of an environmental condition relating to the air conditioning of the vehicle, and for correcting the memorized information of said desired condition based on an operation of the operational portion; and
   a control portion for automatically controlling the air conditioning of the passenger compartment of the vehicle based on the memorized information determined by the detected value of the environmental condition that is read from said memory portion, wherein:
   when the content of a former memorized information read before the detected value of the environmental condition changes is different from that of a latter memorized information read after the detected value of the environmental condition changes, the content of the former memorized information is varied gradually so as to approach that of the latter memorized information, and wherein, the air conditioning is automatically controlled based on said gradually varied information; and said desired condition in said air conditioning is at least one of a blow-out mode of the conditioned air blowing into the passenger compartment, a blowing air amount of the conditioned air blowing into the passenger compartment, an inlet mode of air sucked into the vehicle air conditioner and a blow-out direction of the conditioned air blowing into the passenger compartment.

2. A vehicle air conditioner having automatic control, comprising:
   an operational portion for setting a desired condition in the air conditioning of a passenger compartment of the vehicle that is manually operated by a passenger;
   a memory portion for memorizing information of said desired condition in association with a detected value of an environmental condition relating to the air conditioning of the vehicle, and for correcting the memorized information of said desired condition based on an operation of the operational portion; and
   a control portion for automatically controlling the air conditioning of the passenger compartment of the vehicle based on the memorized information determined by the detected value of the environmental condition that is read from said memory portion, wherein:
     when the content of a former memorized information read before the detected value of the environmental condition changes is different from that of a latter memorized information read after the detected value of the environmental condition changes, the content of the former memorized information is varied gradually so as to approach that of the latter memorized information, and wherein, the air conditioning is automatically controlled based on said gradually varied information: and
     the content in the information is varied gradually so as to change by a predetermined step after a predetermined time has elapsed.

3. A vehicle air conditioner having automatic control according to claim 2, wherein said air conditioning is at least one of a blow-out mode of the conditioned air blowing into the passenger compartment, a blowing air amount of the conditioned air blowing into the passenger compartment, an inlet mode of air sucked into the vehicle air conditioner and a blow-out direction of the conditioned air blowing into the passenger compartment.

4. A vehicle air conditioner having automatic control, comprising:
   an operational portion for setting a desired condition in the air conditioning of a passenger compartment of the vehicle that is manually operated by a passenger;
   a memory portion for memorizing information of said desired condition in association with a detected value of an environmental condition relating to the air conditioning of the vehicle, and for correcting the memorized information of said desired condition based on an operation of the operational portion; and a control portion for automatically controlling the air conditioning of the passenger compartment of the vehicle based on the memorized information determined by the detected value of the environmental condition that is read from said memory portion, wherein:
     when the content of a former memorized information read before the detected value of the environmental condition changes is different from that of a latter memorized information read after the detected value of the environmental condition changes, the content of the former memorized information is varied gradually so as to approach that of the latter memorized information, and wherein, the air conditioning is automatically controlled based on said gradually varied information; and
     the content in the information is varied gradually so as to change by a predetermined step after a predetermined degree of temperature has changed.

5. A vehicle air conditioner having automatic control according to claim 4, wherein said air conditioning is at least one of a blow-out mode of the conditioned air blowing into the passenger compartment, a blowing air amount of the conditioned air blowing into the passenger compartment, an inlet mode of air sucked into the vehicle air conditioner and a blow-out direction of the conditioned air blowing into the passenger compartment.

6. A vehicle air conditioner having automatic control, comprising:
   an operational portion for setting a desired condition in the air conditioning of a passenger compartment of the vehicle that is manually operated by a passenger;
   a memory portion for memorizing information of said desired condition in association with a detected value of an environmental condition relating to the air conditioning of the vehicle, and for correcting the memorized information of said desired condition based on an operation of the operational portion; and
   a control portion for automatically controlling the air conditioning of the passenger compartment of the vehicle based on the memorized information determined by the detected value of the environmental condition that is read from said memory portion, wherein:
     when the content of a former memorized information read before the detected value of the environmental condition changes is different from that of a latter memorized information read after the detected value of the environmental condition changes, the content of the former memorized information is varied gradually so as to approach that of the latter memorized information, and wherein, the air conditioning is automatically controlled based on said gradually varied information; and said air conditioning is a blow-out mode of the conditioned air blowing into the passenger compartment, the blow-out mode comprises:
       a face mode in which the conditioned air is blown toward an upper body of the passenger, a foot mode in which the conditioned air is blown toward feet of the passenger and a bi-level mode in which the conditioned air is blown toward the upper body of the passenger and the feet of the passenger, wherein:
         the blow-out mode is automatically selected among the face mode, the foot mode and the bi-level mode;
         the foot mode is set as the blow-out mode after the bi-level mode is selected as the blow-out mode for a predetermined time period when the blow-out mode changes from the face mode to the foot mode due to change in the environmental condition; and
         the face mode is set as the blow-out mode after the bi-level mode is selected as the blow-out mode for a predetermined time period when the blow-out mode changes from the foot mode to the face mode due to change in the environmental condition.

7. A vehicle air conditioner having automatic control according to claim 6, wherein said air conditioning is at least one of a blow-out mode of the conditioned air blowing into the passenger compartment, a blowing air amount of the conditioned air blowing into the passenger compartment, an inlet mode of air sucked into the vehicle air conditioner and a blow-out direction of the conditioned air blowing into the passenger compartment.

8. A vehicle air conditioner having automatic control, comprising:

an operational portion for setting a desired condition of the air conditioning in a passenger compartment of the vehicle that is manually operated by a passenger;

a memory portion for memorizing information of said desired condition in association with a detected value of an environmental condition relating to the air conditioning of the vehicle; and a control portion for automatically controlling the air conditioning in the passenger compartment of the vehicle based on the memorized information determined by the detected value of the environmental condition that is read from said memory portion, wherein:

when the content of a former memorized information read before the detected value of the environmental condition changes is different from that of a latter memorized information read after the detected value of the environmental condition changes, the content of the former memorized information is varied gradually so as to approach that of the latter memorized information, and wherein, the air conditioning is automatically controlled based on said gradually varied information, and said desired condition of said air conditioning is at least one of a blow-out mode of the conditioned air blowing into the passenger compartment, a blowing air amount of the conditioned air blowing into the passenger compartment, an inlet mode of air sucked into the vehicle air conditioner and a blow-out direction of the conditioned air blowing into the passenger compartment.

* * * * *